US008870144B2

(12) United States Patent
Zavattieri et al.

(10) Patent No.: US 8,870,144 B2
(45) Date of Patent: Oct. 28, 2014

(54) ACTIVE MATERIAL ADAPTIVE OBJECT HOLDERS

(75) Inventors: Pablo D. Zavattieri, Ann Arbor, MI (US); Mark A. Kramarczyk, Sterling Heights, MI (US); Alan L. Browne, Grosse Pointe, MI (US); James Y. Khoury, Macomb, MI (US); Nancy L. Johnson, Northville, MI (US); Chandra S. Namuduri, Troy, MI (US); Senthil N. Karuppaswamy, Rochester Hills, MI (US); Nilesh D. Mankame, Ann Arbor, MI (US); Rainer A. Glaser, Washington, MI (US); Paul W. Alexander, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1750 days.

(21) Appl. No.: 11/744,417

(22) Filed: May 4, 2007

(65) Prior Publication Data

US 2008/0272259 A1    Nov. 6, 2008

(51) Int. Cl.
*A47K 1/08*   (2006.01)
*B60R 7/02*   (2006.01)
*B60N 3/12*   (2006.01)
*B60N 3/10*   (2006.01)

(52) U.S. Cl.
CPC ... *B60R 7/02* (2013.01); *B60N 3/12* (2013.01); *B60N 3/105* (2013.01); *B60N 3/108* (2013.01)
USPC ...................... 248/311.2; 296/24.34; 296/37.8

(58) Field of Classification Search
USPC ............. 248/311.2; 29/243.5, 592, 1; 337/14, 337/34; 116/216; 269/47; 296/24.34, 37.8
See application file for complete search history.

(56) References Cited

U.S. PATENT DOCUMENTS

| 5,735,607 | A | * | 4/1998 | Shahinpoor et al. | 374/187 |
| 5,901,837 | A | * | 5/1999 | Aimi | 200/344 |
| 6,018,387 | A |   | 1/2000 | Eppler et al. | 356/246 |
| 6,720,402 | B2 | * | 4/2004 | Langer et al. | 528/76 |
| 6,827,325 | B2 | * | 12/2004 | Hofmann et al. | 249/134 |
| 6,848,390 | B2 | * | 2/2005 | Akers et al. | 116/216 |
| 7,013,536 | B2 |   | 3/2006 | Golden et al. | 24/442 |
| 7,029,044 | B2 |   | 4/2006 | Browne et al. | 293/137 |
| 7,032,282 | B2 |   | 4/2006 | Powell et al. | 29/426.4 |
| 7,188,498 | B2 | * | 3/2007 | Browne et al. | 72/62 |

(Continued)

FOREIGN PATENT DOCUMENTS

EP    1671841 A1    6/2006

OTHER PUBLICATIONS

European Patent No. 1671841 (A1); Publication Date: Jun. 21, 2006; Abstract Only; 1 Page.

*Primary Examiner* — Todd M Epps
(74) *Attorney, Agent, or Firm* — Cantor Colburn LLP

(57) ABSTRACT

In an embodiment, a device comprises an active material. Activation of the active material causes deformation within the device to conform to and/or retain an object without engaging the object below a surface of the object. In another embodiment, contact with an object causes deformation within the device to conform to and/or retain the object. In yet another embodiment, an object holder can comprise: a recess, a cover disposed over the recess, and a switch configured to cause the active material to retain a deformed shape in the recess. The cover comprises an active material. The active material is configured to deform into the recess when contacted with an object.

12 Claims, 9 Drawing Sheets

(56) References Cited

U.S. PATENT DOCUMENTS

| | | | |
|---|---|---|---|
| 7,538,472 B2* | 5/2009 | Browne et al. | 310/311 |
| 7,628,116 B2* | 12/2009 | Browne et al. | 116/216 |
| 8,096,034 B2* | 1/2012 | Barvosa-Carter et al. | 29/419.1 |
| 8,191,847 B2* | 6/2012 | Mclaughlin et al. | 248/311.2 |
| 8,485,581 B2* | 7/2013 | McKnight et al. | 296/24.34 |
| 2005/0120542 A1* | 6/2005 | Haener et al. | 29/592.1 |
| 2005/0172469 A1* | 8/2005 | Humpert et al. | 29/243.5 |
| 2006/0175020 A1 | 8/2006 | Cheng | 160/84.04 |

* cited by examiner

ACTIVE MATERIAL ADAPTIVE OBJECT HOLDERS

BACKGROUND

The present disclosure relates to object holders, and more particularly, object holders whose functionality/performance is improved through the incorporation of active (smart) materials.

Object holders, particularly in vehicles, are important for consumer convenience, vehicle cleanliness, and freeing driver's attention and hands for the driving task. Depending upon the design of the holder, the typical receptacle can receive and hold, with varying degrees of security/firmness, beverage containers (cups, mugs, and/or bottles). The problem with these holders is that a single holder geometry is generally incapable of accommodating and providing easy occupant accessibility for all these different types of objects and is often incapable of adequately securing their position and orientation under the various range of accelerations that may be experienced while driving a vehicle.

There is a continual desire to refine the object holders within a vehicle to enable a single holder to successfully secure various shapes and sizes of objects while providing easy access.

BRIEF SUMMARY

Disclosed herein are methods and systems for holding an object and processes for using the same.

In one embodiment, an object holder can comprise: a recess, a cover disposed over the recess, and a switch configured to cause the active material to retain a deformed shape in the recess. The cover comprises an active material. The active material is configured to deform into the recess when contacted with an object.

In another embodiment, an object holder comprises: a recess, a holding portion disposed in the recess and comprising an active material, and a switch configured to retain the active material in the deformed shape until the object is removed. The active material is configured to, when contacted with an object, receive the object and deform to the shape of the object.

In still another embodiment, an object holder can comprise: a recess, a liner disposed in the recess, and a switch configured to initiate a transformation in of an active material when an object is disposed in the recess. The liner can comprise an active material.

In yet another embodiment, an object holder comprises: an extension comprising active material and/or a sensor. The extension is configured such that when an object contacts the extension or a second sensor, the active material is activated to cover a portion of and to push against the object when in a deployed position.

In another embodiment, an object holder can comprise: a recess configured to receive and create a positive hold on an object, and a smart attachment base comprising an active material and configured to releasably secure holder to a surface.

In another embodiment, a device comprises an active material. Activation of the active material causes deformation within the device to conform to and/or retain an object without engaging the object below a surface of the object.

In still another embodiment, a device comprises an active material. Contact with an object causes deformation within the device to conform to and/or retain the object.

The above described and other features are exemplified by the following figures and detailed description.

BRIEF DESCRIPTION OF THE DRAWINGS

Refer now to the figures, which are exemplary embodiments and wherein the like elements are numbered alike.

DETAILED DESCRIPTION

Figure 1:
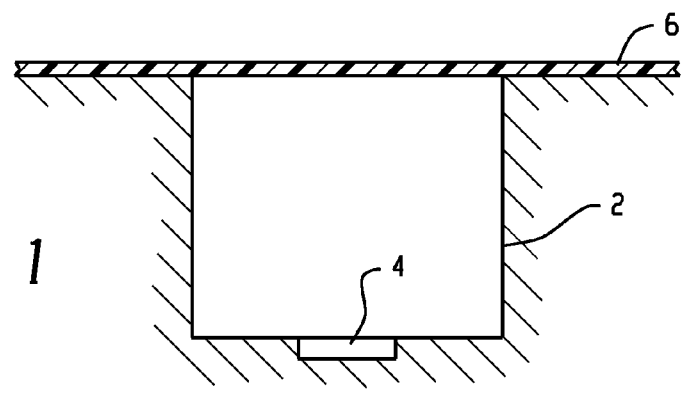
FIG. 1 is a cross-sectional view of one embodiment of a holder.

The following description of the embodiments is merely exemplary in nature and is in no way intended to limit the disclosure, its application, or uses.

Object holders with the capacity to accommodate large travel mugs tend to be too large for soda cans, bottles, smaller mugs, and other cups. As a result, these smaller objects can spill and/or become dislodged. Active materials can provide added functionality to an object holder, enabling the holder to push on, press against, and/or grasp the object, conforming in some manner to the size and shape of the object. As a result, the holder is compatible with numerous objects, such as cups, cans, bottles, writing instruments (e.g., pens, pencils, and markers), coins, sunglasses, cellular phones, radar detectors, radios (e.g., satellite radio), MP3 players, remote openers (e.g., garage openers and gate openers), transponders, keys, and many other items. Additionally, since the object is grasped or secured in some manner (instead of merely set in a holder), it is retained and will not inadvertently dislodge in the event of sudden acceleration or similar driving conditions.

To further improve the functionality of these devices, retention of an object can be attained without the assistance of gravity due to the grasping/conforming capabilities provided by active materials (e.g. secured to the visor, ceiling, headrest, etc.).

In some embodiments, the holder can have a flexible cover over the holder area such that the opening of the holder is flush with the area surrounding the holder. This simplifies cleaning of the holder and enhances the aesthetics of the area in which the holder is located (e.g., the console, dashboard, or other location in a vehicle). In other words, the holder is capable of containing/constraining multiple sized items and when not in use it can provide a planar and possibly smooth surface that is easier to clean. In many scenarios it can be seen that a singularly sized holder is not universal enough for the wide range of objects that a vehicle occupant may desire to secure within the cabin. An active material enabled adaptive holder can conform to, press against, and even grip different items, and hence render a single holder multifunctional.

In some embodiments, the holder can have a surface with a defined surface area, and when activated a section or all of the surface may change. Activation can be accomplished passively (e.g., by contact or proximity to the object to be held (such as heat flow from a hot cup of coffee)), manually (such as by a button, pressure switch, and so forth), and/or via a sensor (such as contact, proximity (capacitance), etc.). For example, the AM can be actively modified to shrink or grow around an object. Additionally, or in the alternative, sensor(s) can be used to sense the presence of the object, e.g., sense the placement of an object onto/in the adaptive holder, and/or sense the pressure applied to the newly formed recess or receptacle, so that it is known when the object has been removed from the adaptive holder. The surface creating a void/extrusion can be concealed and revealed as desired. It can be placed on any surface feature including door trim, consoles, glove box doors, pop out devices, instrument panels, seat backs, headliners, sun visors, flip trays, cargo boxes, quarter trim, and so forth. Additionally, the holder can be used in various settings, such as transportation vehicles (planes, trains, water craft, trucks, trailers, subways, etc.), in buildings (office building, stores, homes, schools, restaurants, sports arenas, event venues, etc.), as well as other locations.

A number of exemplary embodiments of active material holding assemblies are described herein. The active holder assemblies all utilize active material components. Exemplary active materials (AM) include: shape memory alloys ("SMAs"; e.g., thermal and stress activated shape memory alloys and magnetic shape memory alloys (MSMA)), electroactive polymers (EAPs) such as dielectric elastomers, ionic polymer metal composites (IPMC), piezoelectric materials (e.g., polymers, ceramics), and shape memory polymers (SMPs), shape memory ceramics (SMCs), baroplastics, magnetorheological (MR) materials (e.g., fluids and elastomers), electrorheological (ER) materials (e.g., fluids, and elastomers), composites of the foregoing active materials with non-active materials, systems comprising at least one of the foregoing active materials, and combinations comprising at least one of the foregoing active materials. For convenience and by way of example, reference herein will be made to shape memory alloys and shape memory polymers. The shape memory ceramics, baropastics, and the like, can be employed in a similar manner. For example, with baroplastic materials, a pressure induced mixing of nanophase domains of high and low glass transition temperature (Tg) components effects the shape change. Baroplastics can be processed at relatively low temperatures repeatedly without degradation. SMCs are similar to SMAs but can tolerate much higher operating temperatures than can other shape-memory materials. An example of an SMC is a piezoelectric material.

The ability of shape memory materials to return to their original shape upon the application or removal of external stimuli has led to their use in actuators to apply force resulting in desired motion. Active material actuators offer the potential for a reduction in actuator size, weight, volume, cost, noise and an increase in robustness in comparison with traditional electromechanical and hydraulic means of actuation. Ferromagnetic SMA's, for example, exhibit rapid dimensional changes of up to several percent in response to (and proportional to the strength of) an applied magnetic field. However, these changes are one-way changes and use the application of either a biasing force or a field reversal to return the ferromagnetic SMA to its starting configuration.

Shape memory alloys are alloy compositions with at least two different temperature-dependent phases or polarity. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature ($A_s$). The temperature at which this phenomenon is complete is often called the austenite finish temperature ($A_f$). When the shape memory alloy is in the austenite phase and is cooled, it begins to change into the martensite phase, and the temperature at which this phenomenon starts is often referred to as the martensite start temperature ($M_s$). The temperature at which austenite finishes transforming to martensite is often called the martensite finish temperature ($M_f$). The range between $A_s$ and $A_f$ is often referred to as the martensite-to-austenite transformation temperature range while that between $M_s$ and $M_f$ is often called the austenite-to-martensite transformation temperature range. It should be noted that the above-mentioned transition temperatures are functions of the stress experienced by the SMA sample. Generally, these temperatures increase with increasing stress. In view of the foregoing properties, deformation of the shape memory alloy is preferably at or below the austenite start temperature (at or below $A_s$). Subsequent heating above the austenite start temperature causes the deformed shape memory material sample to begin to revert back to its original (nonstressed) permanent shape until completion at the austenite finish temperature. Thus, a suitable activation input or signal for use with shape memory alloys is a thermal activation signal having a magnitude that is sufficient to cause transformations between the martensite and austenite phases.

The temperature at which the shape memory alloy remembers its high temperature form (i.e., its original, nonstressed shape) when heated can be adjusted by slight changes in the composition of the alloy and through thermo-mechanical processing. In nickel-titanium shape memory alloys, for example, it can be changed from above about 100° C. to below about −100° C. The shape recovery process can occur over a range of just a few degrees or exhibit a more gradual recovery over a wider temperature range. The start or finish of the transformation can be controlled to within several degrees depending on the desired application and alloy composition. The mechanical properties of the shape memory alloy vary greatly over the temperature range spanning their transformation, typically providing shape memory effect and superelastic effect. For example, in the martensite phase a lower elastic modulus than in the austenite phase is observed. Shape memory alloys in the martensite phase can undergo large deformations by realigning the crystal structure arrangement with the applied stress. The material will retain this shape after the stress is removed. In other words, stress induced phase changes in SMA are two-way by nature, application of sufficient stress when an SMA is in its austenitic phase will cause it to change to its lower modulus Martensitic phase. Removal of the applied stress will cause the SMA to switch back to its Austenitic phase, and in so doing, recovering its starting shape and higher modulus.

Exemplary shape memory alloy materials include nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and so forth. The alloys can be binary, ternary, or any higher order so long as the alloy composition exhibits a shape memory effect, e.g., change in shape, orientation, yield strength, flexural modulus, damping capacity, superelasticity, and/or similar properties. Selection of a suitable shape memory alloy composition depends, in part, on the temperature range of the intended application.

The recovery to the austenite phase at a higher temperature is accompanied by very large (compared to that needed to deform the material) stresses which can be as high as the inherent yield strength of the austenite material, sometimes up to three or more times that of the deformed martensite phase. For applications that require a large number of operating cycles, a strain of less than or equal to 4% or so of the deformed length of wire used can be obtained. In experiments performed with Flexinol® wires of 0.5 millimeter (mm) diameter, the maximum strain in the order of 4% was obtained. This percentage can increase up to 8% for thinner wires or for applications with a low number of cycles. This limit in the obtainable strain places significant constraints in the application of SMA actuators where space is limited.

MSMAs are alloys; often composed of Ni—Mn—Ga, that change shape due to strain induced by a magnetic field. MSMAs have internal variants with different magnetic and crystallographic orientations. In a magnetic field, the proportions of these variants change, resulting in an overall shape change of the material. An MSMA actuator generally requires that the MSMA material be placed between coils of an electromagnet. Electric current running through the coil induces a magnetic field through the MSMA material, causing a change in shape.

As previously mentioned, other exemplary shape memory materials are shape memory polymers (SMPs). "Shape memory polymer" generally refers to a polymeric material, which exhibits a change in a property, such as a modulus, a dimension, a coefficient of thermal expansion, the permeability to moisture, an optical property (e.g., transmissivity), or a combination comprising at least one of the foregoing properties in combination with a change in its a microstructure and/or morphology upon application of an activation signal. Shape memory polymers can be thermoresponsive (i.e., the change in the property is caused by a thermal activation signal delivered either directly via heat supply or removal, or indirectly via a vibration of a frequency that is appropriate to excite high amplitude vibrations at the molecular level which lead to internal generation of heat), photoresponsive (i.e., the change in the property is caused by an electromagnetic radiation activation signal), moisture-responsive (i.e., the change in the property is caused by a liquid activation signal such as humidity, water vapor, or water), chemo-responsive (i.e. responsive to a change in the concentration of one or more chemical species in its environment; e.g., the concentration of $H^+$ ion—the pH of the environment), or a combination comprising at least one of the foregoing.

Generally, SMPs are phase segregated co-polymers comprising at least two different units, which can be described as defining different segments within the SMP, each segment contributing differently to the overall properties of the SMP. As used herein, the term "segment" refers to a block, graft, or sequence of the same or similar monomer or oligomer units, which are copolymerized to form the SMP. Each segment can be (semi-)crystalline or amorphous and will have a corresponding melting point or glass transition temperature (Tg), respectively. The term "thermal transition temperature" is used herein for convenience to generically refer to either a Tg or a melting point depending on whether the segment is an amorphous segment or a crystalline segment. For SMPs comprising (n) segments, the SMP is said to have a hard segment and (n−1) soft segments, wherein the hard segment has a higher thermal transition temperature than any soft segment. Thus, the SMP has (n) thermal transition temperatures. The thermal transition temperature of the hard segment is termed the "last transition temperature", and the lowest thermal transition temperature of the so-called "softest" segment is termed the "first transition temperature". It is important to note that if the SMP has multiple segments characterized by the same thermal transition temperature, which is also the last transition temperature, then the SMP is said to have multiple hard segments.

When the SMP is heated above the last transition temperature, the SMP material can be imparted a permanent shape. A permanent shape for the SMP can be set or memorized by subsequently cooling the SMP below that temperature. As used herein, the terms "original shape", "previously defined shape", "predetermined shape", and "permanent shape" are synonymous and are intended to be used interchangeably. A temporary shape can be set by heating the material to a temperature higher than a thermal transition temperature of any soft segment yet below the last transition temperature, applying an external stress or load to deform the SMP, and then cooling below the particular thermal transition temperature of the soft segment while maintaining the deforming external stress or load.

The permanent shape can be recovered by heating the material, with the stress or load removed, above the particular thermal transition temperature of the soft segment yet below the last transition temperature. Thus, it should be clear that by combining multiple soft segments it is possible to demonstrate multiple temporary shapes and with multiple hard segments it can be possible to demonstrate multiple permanent shapes. Similarly using a layered or composite approach, a combination of multiple SMPs will demonstrate transitions between multiple temporary and permanent shapes.

The shape memory material may also comprise a piezoelectric material. Also, in certain embodiments, the piezoelectric material can be configured as an actuator for providing rapid deployment. As used herein, the term "piezoelectric" is used to describe a material that mechanically deforms (changes shape) when a voltage potential is applied, or conversely, generates an electrical charge when mechanically deformed. Piezoelectrics exhibit a small change in dimensions when subjected to the applied voltage, with the response being proportional to the strength of the applied field and being quite fast (capable of easily reaching the thousand hertz range). Because their dimensional change is small (e.g., less than 0.1%), to dramatically increase the magnitude of dimensional change they are usually used in the form of piezo ceramic unimorph and bi-morph flat patch actuators which are constructed so as to bow into a concave or convex shape upon application of a relatively small voltage. The morphing/bowing of such patches within the liner of the holder is suitable for grasping/releasing the object held.

One type of unimorph is a structure composed of a single piezoelectric element externally bonded to a flexible metal foil or strip, which is stimulated by the piezoelectric element when activated with a changing voltage and results in an axial buckling or deflection as it opposes the movement of the piezoelectric element. The actuator movement for a unimorph can be by contraction or expansion. Unimorphs can exhibit a strain of as high as about 10%, but generally can only sustain low loads relative to the overall dimensions of the unimorph structure. A commercial example of a pre-stressed unimorph is referred to as "THUNDER", which is an acronym for Thin layer composite UNimorph ferroelectric Driver and sEnsoR. THUNDER is a composite structure constructed with a piezoelectric ceramic layer (for example, lead zirconate titanate), which is electroplated on its two major faces. A metal pre-stress layer is adhered to the electroplated surface on at least one side of the ceramic layer by an adhesive layer (for example, "LaRC-SI®" developed by the National Aeronautics and Space Administration (NASA)). During manufacture of a THUNDER actuator, the ceramic layer, the adhesive layer, and the first pre-stress layer are simultaneously heated to a temperature above the melting point of the adhesive, and then subsequently allowed to cool, thereby re-solidifying and setting the adhesive layer. During the cooling process the ceramic layer becomes strained, due to the higher coefficients of thermal contraction of the metal pre-stress layer and the adhesive layer than of the ceramic layer. Also, due to the greater thermal contraction of the laminate materials than the ceramic layer, the ceramic layer deforms into an arcuate shape having a generally concave face.

In contrast to the unimorph piezoelectric device, a bimorph device includes an intermediate flexible metal foil sandwiched between two piezoelectric elements. Bimorphs exhibit more displacement than unimorphs because under the applied voltage one ceramic element will contract while the other expands. Bimorphs can exhibit strains up to about 20%, but similar to unimorphs, generally cannot sustain high loads relative to the overall dimensions of the unimorph structure.

Exemplary piezoelectric materials include inorganic compounds, organic compounds, and metals. With regard to organic materials, all of the polymeric materials with noncentrosymmetric structure and large dipole moment group(s) on the main chain or on the side-chain, or on both chains within the molecules, can be used as candidates for the piezoelectric film. Examples of polymers include poly(sodium 4-styrene-sulfonate) ("PSS"), poly S-119 (Poly(vinylamine) backbone azo chromophore), and their derivatives; polyfluorocarbines, including polyvinylidene fluoride ("PVDF"), its co-polymer vinylidene fluoride ("VDF"), trifluorethylene (TrFE), and their derivatives; polychlorocarbons, including poly(vinyl-chloride) ("PVC"), polyvinylidene chloride ("PVC2"), and their derivatives; polyacrylonitriles ("PAN"), and their derivatives; polycarboxylic acids, including poly(methacrylic acid ("PMA"), and their derivatives; polyureas, and their derivatives; polyurethanes ("PUE"), and their derivatives; bio-polymer molecules such as poly-L-lactic acids and their derivatives, and membrane proteins, as well as phosphate bio-molecules; polyanilines and their derivatives, and all of the derivatives of tetraamines; polyimides, including Kapton® molecules and polyetherimide ("PEI"), and their derivatives; all of the membrane polymers; poly(N-vinyl pyrrolidone) ("PVP") homopolymer, and its derivatives, and random PVP-co-vinyl acetate ("PVAc") copolymers; and all of the aromatic polymers with dipole moment groups in the main-chain or side-chains, or in both the main-chain and the side-chains; as well as combinations comprising at least one of the foregoing.

Further, piezoelectric materials can include Pt, Pd, Ni, T, Cr, Fe, Ag, Au, Cu, and metal alloys comprising at least one of the foregoing, as well as combinations comprising at least one of the foregoing. These piezoelectric materials can also include, for example, metal oxide such as $SiO_2$, $Al_2O_3$, $ZrO_2$, $TiO_2$, $SrTiO_3$, $PbTiO_3$, $BaTiO_3$, $FeO_3$, $Fe_3O_4$, $ZnO$, and combinations comprising at least one of the foregoing; and Group VIA and IIB compounds, such as CdSe, CdS, GaAs, $AgCaSe_2$, ZnSe, GaP, InP, ZnS, and combinations comprising at least one of the foregoing.

MR fluids is a class of smart materials whose rheological properties can rapidly change upon application of a magnetic field (e.g., property changes of several hundred percent can be effected within a couple of milliseconds), making them quite suitable in locking in (constraining) or allowing the relaxation of shapes/deformations through a significant change in their shear strength, such changes being usefully employed with grasping and release of objects in embodiments described herein. Exemplary shape memory materials also comprise magnetorheological (MR) and ER polymers. MR polymers are suspensions of micrometer-sized, magnetically polarizable particles (e.g., ferromagnetic or paramagnetic particles as described below) in a polymer (e.g., a thermoset elastic polymer or rubber). Exemplary polymer matrices include poly-alpha-olefins, natural rubber, silicone, polybutadiene, polyethylene, polyisoprene, and combinations comprising at least one of the foregoing.

The stiffness and potentially the shape of the polymer structure are attained by changing the shear and compression/tension moduli by varying the strength of the applied magnetic field. The MR polymers typically develop their structure when exposed to a magnetic field in as little as a few milliseconds, with the stiffness and shape changes being proportional to the strength of the applied field. Discontinuing the exposure of the MR polymers to the magnetic field reverses the process and the elastomer returns to its lower modulus state. Packaging of the field generating coils, however, creates challenges.

MR fluids exhibit a shear strength which is proportional to the magnitude of an applied magnetic field, wherein property changes of several hundred percent can be effected within a couple of milliseconds. Although these materials also face the issues packaging of the coils necessary to generate the applied field, they can be used as a locking or release mechanism, for example, for spring based grasping/releasing.

Suitable MR fluid materials include ferromagnetic or paramagnetic particles dispersed in a carrier, e.g., in an amount of about 5.0 volume percent (vol %) to about 50 vol % based upon a total volume of MR composition. Suitable particles include iron; iron oxides (including $Fe_2O_3$ and $Fe_3O_4$); iron nitride; iron carbide; carbonyl iron; nickel; cobalt; chromium dioxide; and combinations comprising at least one of the foregoing; e.g., nickel alloys; cobalt alloys; iron alloys such as stainless steel, silicon steel, as well as others including aluminum, silicon, cobalt, nickel, vanadium, molybdenum, chromium, tungsten, manganese and/or copper.

The particle size should be selected so that the particles exhibit multiple magnetic domain characteristics when subjected to a magnetic field. Particle diameters (e.g., as measured along a major axis of the particle) can be less than or equal to about 1,000 micrometers (μm) (e.g., about 0.1 micrometer to about 1,000 micrometers), or, more specifically, about 0.5 to about 500 micrometers, and more specifically, about 10 to about 100 micrometers.

The viscosity of the carrier can be less than or equal to about 100,000 centipoise (cPs) (e.g., about 1 cPs to about 100,000 cPs), or, more specifically, about 250 cPs to about 10,000 cPs, or, even more specifically, about 500 cPs to about 1,000 centipoise. Possible carriers (e.g., carrier fluids) include organic liquids, especially non-polar organic liquids. Examples include oils (e.g., silicon oils, mineral oils, paraffin oils, white oils, hydraulic oils, transformer oils, and synthetic hydrocarbon oils (e.g., unsaturated and/or saturated)); halogenated organic liquids (such as chlorinated hydrocarbons, halogenated paraffins, perfluorinated polyethers and fluorinated hydrocarbons); diesters; polyoxyalkylenes; silicones (e.g., fluorinated silicones); cyanoalkyl siloxanes; glycols; and combinations comprising at least one of the foregoing carriers.

Aqueous carriers can also be used, especially those comprising hydrophilic mineral clays such as bentonite or hectorite. The aqueous carrier can comprise water or water comprising a polar, water-miscible organic solvent (e.g., methanol, ethanol, propanol, dimethyl sulfoxide, dimethyl formamide, ethylene carbonate, propylene carbonate, acetone, tetrahydrofuran, diethyl ether, ethylene glycol, propylene glycol, and the like), as well as combinations comprising at least one of the foregoing carriers. The amount of polar organic solvent in the carrier can be less than or equal to about 5.0 vol % (e.g., about 0.1 vol % to about 5.0 vol %), based upon a total volume of the MR fluid, or, more specifically, about 1.0 vol % to about 3.0%. The pH of the aqueous carrier can be less than or equal to about 13 (e.g., about 5.0 to about 13), or, more specifically, about 8.0 to about 9.0.

When the aqueous carriers comprises natural and/or synthetic bentonite and/or hectorite, the amount of clay (bentonite and/or hectorite) in the MR fluid can be less than or equal to about 10 percent by weight (wt %) based upon a total weight of the MR fluid, or, more specifically, about 0.1 wt % to about 8.0 wt %, or, more specifically, about 1.0 wt % to about 6.0 wt %, or, even more specifically, about 2.0 wt % to about 6.0 wt %.

Optional components in the MR fluid include clays (e.g., organoclays), carboxylate soaps, dispersants, corrosion inhibitors, lubricants, anti-wear additives, antioxidants, thixotropic agents, and/or suspension agents. Carboxylate soaps include ferrous oleate, ferrous naphthenate, ferrous stearate, aluminum di- and tri-stearate, lithium stearate, calcium stearate, zinc stearate, and/or sodium stearate; surfactants (such as sulfonates, phosphate esters, stearic acid, glycerol monooleate, sorbitan sesquioleate, laurates, fatty acids, fatty alcohols, fluoroaliphatic polymeric esters); and coupling agents (such as titanate, aluminate, and zirconate); as well as combinations comprising at least one of the foregoing. Polyalkylene diols, such as polyethylene glycol, and partially esterified polyols can also be included.

Electrorheological fluids (ER) fluids are similar to MR fluids in that they exhibit a change in shear strength when subjected to an applied field, in this case a voltage rather than a magnetic field. Response is quick and proportional to the strength of the applied field. It is, however, an order of magnitude less than that of MR fluids and several thousand volts are typically required.

Electronic electroactive polymers (EAPs) are a laminate of a pair of electrodes with an intermediate layer of low elastic modulus dielectric material. Applying a potential between the electrodes squeezes the intermediate layer causing it to expand in plane. They exhibit a response proportional to the applied field and can be actuated at high frequencies. EAP morphing laminate sheets have been demonstrated (by the company Artificial Muscle Inc. at 2005 SPIE Conference). Their major downside is that they require applied voltages approximately three orders of magnitude greater than those required by piezoelectrics Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive molecular composite systems.

Materials suitable for use as an electroactive polymer may include any substantially insulating polymer and/or rubber that deforms in response to an electrostatic force or whose deformation results in a change in electric field. Exemplary materials suitable for use as a pre-strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties (e.g., copolymers comprising silicone and acrylic moieties, polymer blends comprising a silicone elastomer and an acrylic elastomer, and so forth).

Materials used as an electroactive polymer can be selected based on material propert(ies) such as a high electrical breakdown strength, a low modulus of elasticity (e.g., for large or small deformations), a high dielectric constant, and so forth. In one embodiment, the polymer can be selected such that is has an elastic modulus of less than or equal to about 100 MPa. In another embodiment, the polymer can be selected such that is has a maximum actuation pressure of about 0.05 megapascals (MPa) and about 10 MPa, or, more specifically, about 0.3 MPa to about 3 MPa. In another embodiment, the polymer can be selected such that is has a dielectric constant of about 2 and about 20, or, more specifically, about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers can be fabricated and implemented as thin films, e.g., having a thickness of less than or equal to about 50 micrometers.

As electroactive polymers may deflect at high strains, electrodes attached to the polymers should also deflect without compromising mechanical or electrical performance. Generally, electrodes suitable for use can be of any shape and material provided that they are able to supply a suitable voltage to, or receive a suitable voltage from, an electroactive polymer. The voltage can be either constant or varying over time. In one embodiment, the electrodes adhere to a surface of the polymer. Electrodes adhering to the polymer can be compliant and conform to the changing shape of the polymer. The electrodes can be only applied to a portion of an electroactive polymer and define an active area according to their geometry. Various types of electrodes include structured electrodes comprising metal traces and charge distribution layers, textured electrodes comprising varying out of plane dimensions, conductive greases (such as carbon greases and silver greases), colloidal suspensions, high aspect ratio conductive materials (such as carbon fibrils and carbon nanotubes, and mixtures of ionically conductive materials), as well as combinations comprising at least one of the foregoing.

Exemplary electrode materials can include graphite, carbon black, colloidal suspensions, metals (including silver and gold), filled gels and polymers (e.g., silver filled and carbon filled gels and polymers), and ionically or electronically conductive polymers, as well as combinations comprising at least one of the foregoing. It is understood that certain electrode materials may work well with particular polymers and may not work as well for others. By way of example, carbon fibrils work well with acrylic elastomer polymers while not as well with silicone polymers.

Magnetostrictives are solids that develop a large mechanical deformation when subjected to an external magnetic field. This magnetostriction phenomenon is attributed to the rotations of small magnetic domains in the materials, which are randomly oriented when the material is not exposed to a magnetic field. The shape change is largest in ferromagnetic or ferromagnetic solids (e.g., Terfenol-D). These materials possess a very fast response capability, with the strain proportional to the strength of the applied magnetic field, and they return to their starting dimension upon removal of the field. However, these materials have maximum strains of about 0.1 to about 0.2 percent.

Figure 2:
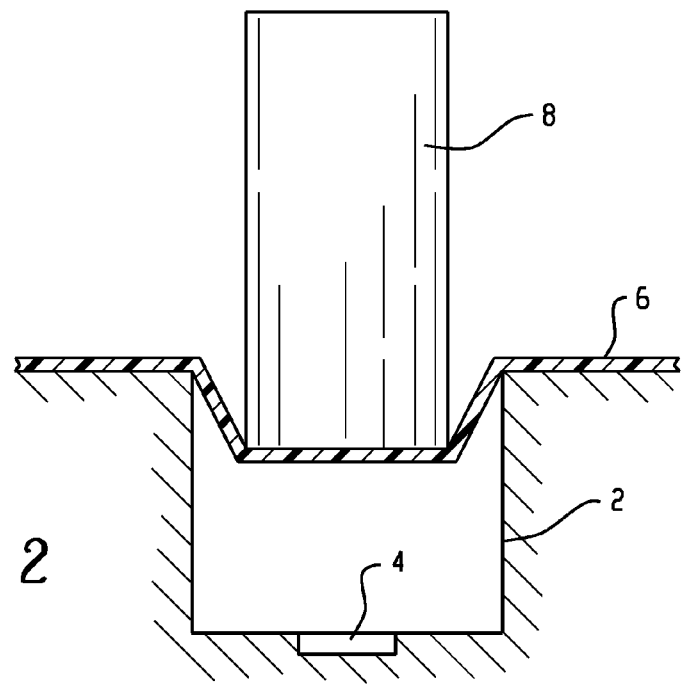
FIG. 2 is a cross-sectional view of the holder of FIG. 1 as an object is being placed in the holder.
Figure 3:
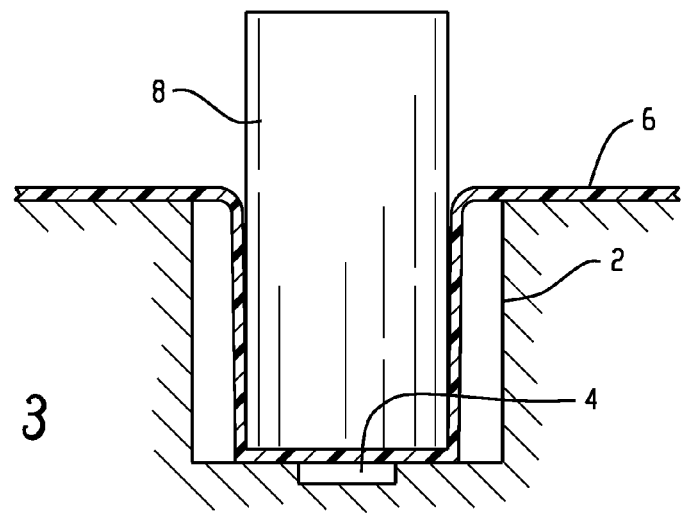
FIG. 3 is a cross-sectional view of the holder of FIG. 1 with an object in the holder and the active material cover holding the object.

In one embodiment illustrated in FIGS. 1-3, the holder comprises a recess 2, a switch (e.g., switch, sensor, controller, and so forth) 4, and a cover 6. The cover can optionally comprise a sensor (not shown). When an object, e.g., soda can 8, is placed on the cover 6, the cover stretches, conforming to the can 8 and allowing the can 8 to move into the recess 2. Once the can has reached the bottom of the recess 2, the switch (e.g., weight activated switch) activates AM to constrict the cover around the object 8, deforming into the recess 2, and hold it within the recess 2. Here, the cover can be an AM (e.g., shape memory polymer), a flexible material (e.g., neoprene, leather), with an AM layer, and so forth. Here, the activation switch 4 (e.g., a weight activated switch) at the base of the holder can cause a slight constriction around the container 8. The cover 6 will deform to accept the object (can 8). Contact with the switch 4 will energizes the cover 6 to fix the cover shape and retain the object.

There are many ways to create a void to hold something. It can be done with a continuous surface that may form a void with a top down view of a circle, star pattern, triangle, etc. They void may also be sloped and may have compound curves, bumps and small contacts to better hold and create pressure or a desired level of friction for items to be placed and easily removed or tightly held. The void may also be created with a non-continuous surface. Extruding extension (s) (e.g., referred to as fingers) may also be used to hold items. Fingers may be in some quantity, if there are two with enough width and contour items can be held, and so on and so forth in quantities. Here, the cover 6 can be made of a material with embedded AM (e.g., embedded concentric ring shaped patterns of stretched SMA). When the object is placed on the cover, it will sink in, deforming the flexible cover elastically. The SMA can then be activated to shrink concentric rings and grasp the object; e.g., holding is in a power on state. Deactivation of the SMA will then releases the object and will drop the modulus of the SMA rings, allowing the elastically deformed flexible material to return to its original flat cover shape and in so doing re-stretch the SMA.

In another embodiment, the cover can comprise SMP. Activation of the cover 6 by heating the cover 6 softens it, allowing the object to sink into the recess. Cooling of the SMP then stiffens the SMP, retaining the depression shape, and holding the object. Reheating of the SMP drops its modulus and allows the object to be removed. Upon removal, while the SMP is still heated, its shape memory property will cause it to revert back to its original flat cover shape.

In another embodiment, a zero power hold can be employed. Here a circular cavity comprises convex protrusion(s) (e.g., regular and/or irregular protrusions such as bump(s), prong(s), finger(s), fin(s), bristle(s), flexible rod(s) bubble(s), or otherwise shaped protrusions) along its sides. The protrusions contain SMA in various forms (e.g., a sheet, wire, etc.). The SMA has a memorized high temperature undeformed (flat and/or straight) geometry but has been deformed (to match the shape of the desired protrusion) prior to embedding in the flexible wall lining of the cavity. To insert an object (e.g., a cup, cellular phone, sun glasses, etc.), the SMA would be activated to flatten the protrusions, thereby smoothing the sides of the cavity, and allowing the object to be inserted. Once the object was inserted, the power could be switched off, thereby deactivating the SMA, allowing the elastically deformed flexible wall to return to its protruded shape, and in so doing re-stretching the SMA and grasping the object. Release of the object can then be accomplished by again activating the SMA.

The above embodiment can similarly be accomplished with SMP, wherein the sidewalls comprising the protrusions are fabricated from a suitable SMP. Heating the SMP will cause the protrusions to soften (for example, by a factor of greater than or equal to about 30), thereby allowing the insertion of an object. Ceasing the supply of power will result in cooling of the SMP, locking the SMP in the conforming shape, and thereby holding the object. Reheating the SMP will allow easy removal of the object and cause the SMP protrusions to return to their starting shape. The protrusions could even be vertical SMP protrusions on flat horizontal surface. Here, heating the SMP and pressing an object against it would create an indentation in the protrusions that conforms to the geometry of the object. This would restrict lateral movement of the object.

Figure 4:
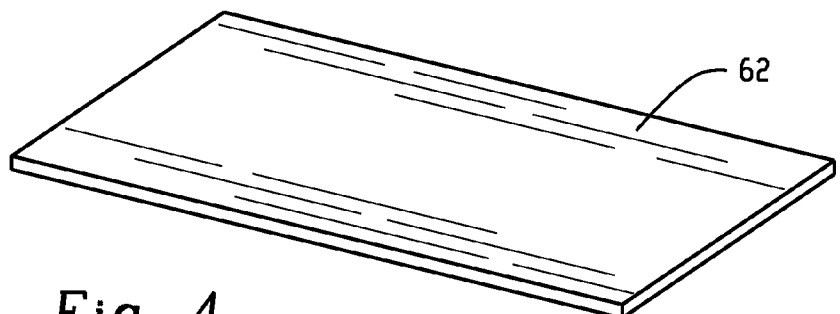
FIGS. 4 and 5 are isometric views of an exemplary embodiment of an active material surface.
Figure 5:
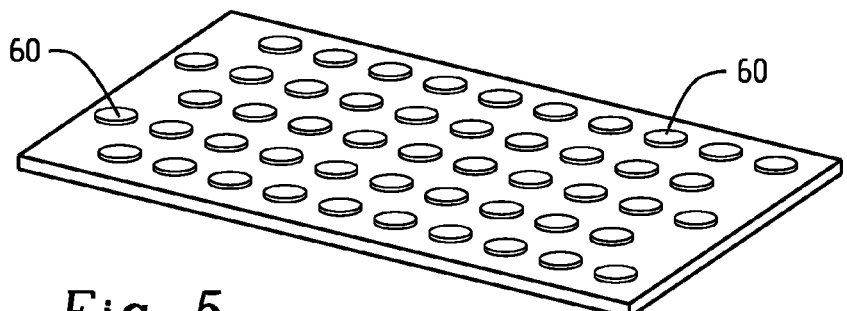

For example, referring to FIGS. 4 and 5, a surface incorporating active materials can be designed so that, upon activation, its surface texture, stiffness, and/or adhesive properties change such that its static friction coefficient dramatically changes, thereby making items much less likely to slide on the surface while driving. When activated, small protrusions 60 in the surface would become visible increasing surface roughness, or the surface could become very soft, almost gel-like, so an object would form slight depressions that would help prevent sliding, and finally, the adhesive properties of the surface could be increased upon activation, forming a better bond with the object to prevent sliding. The surface in the inactive state (62) can be harder, stiffer, flatter, smoother, and/or less tacky so that it resembles other materials used to trim the cabin of the vehicle. In a similar embodiment, the converse could happen upon activation, where activation of the material would produce the second, lower friction state and the inactive state would be the high friction surface. The ability to change these surface properties on demand through the activation/deactivation of active materials could also be used to would facilitate cleaning of the surface.

In yet another embodiment, the cover can comprise a hybrid combination of SMA and SMP (e.g., a laminate, and/or mix of flexible material and SMP) embedded concentric ring shaped patterns of stretched SMA. Here, the SMP would have a lower transformation temperature than the SMA. In use, the SMP would be softened by heating such that the object placed on the cover 6 will sink into the recess 2, deforming the flexible material in the cover 6 elastically. The SMA would then be activated to shrink the hoops and grasp the cup/object. The majority of the SMP would be cooled prior to cooling the SMA. As a result, the SMP would lock in the deformed shape which would thus be retained upon cooling of the SMA, i.e. this would provide zero power hold. Reheating the SMP would drop its modulus allowing the elastically stored energy in the flexible material to stretch both SMP and SMA allowing the cup or other object to be removed and the holder/holder cover to return to its original shape.

Yet another embodiment comprises a portable holder such that the holder can be attached in a desired location (such as to an arm of a chair, and so forth), e.g. a non-adaptive holder (one without a smart material to hold the item) that has a smart attachment base, or an adaptive holder (e.g., that exploits the smart material embodiment(s) described herein) and that optionally has a smart attachment base. The adaptive holder system would snug down to create positive hold on the object, while the smart attachment base would secure the object and holder to the surface that it contacts. For example, the portable holder can have smart hook attachment area(s) variously on its base and/or sides that will allow it to be attached to any surface (e.g., horizontal or vertical) with loops. Detailed descriptions of exemplary hook and loop designs that can be employed are disclosed in U.S. Published Application No. US 2004-0074060 A1 to Browne et al., U.S. Pat. No. 7,013,536 to Golden et al., and U.S. Pat. No. 7,032,282 to Powell et al.

Figure 6:
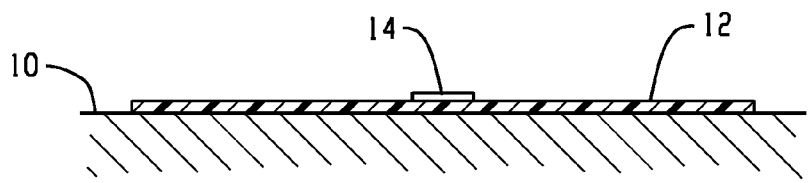
FIG. 6 is a cross-sectional view of another embodiment of an active material holder.
Figure 7:
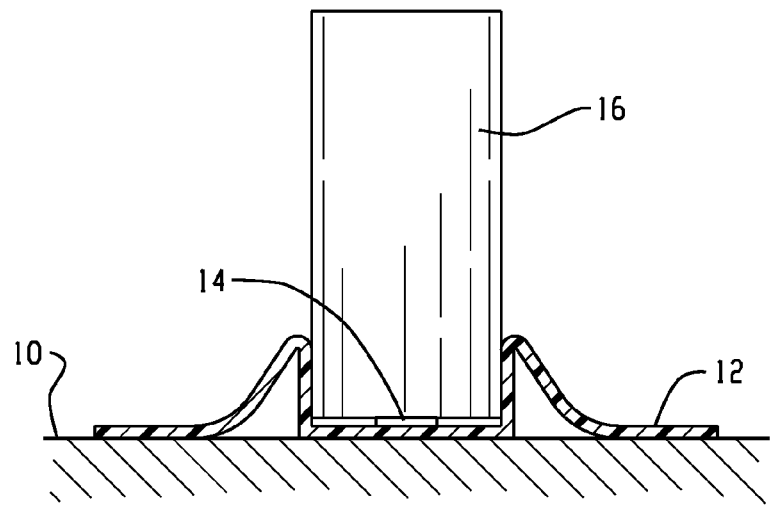
FIG. 7 is a cross-sectional view of the holder of FIG. 6 holding an object.
Figure 8:
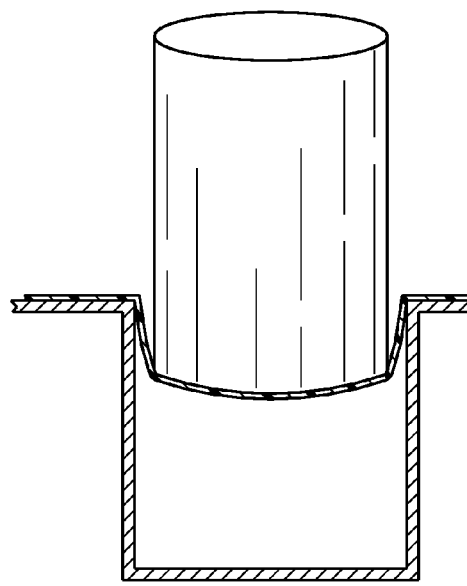
FIGS. 8-11 are exemplary sequential illustrations of an exemplary process that uses a holder comprising a combination of the embodiments illustrated in FIG. 3 with the embodiment illustrated in FIG. 7.
Figure 9:
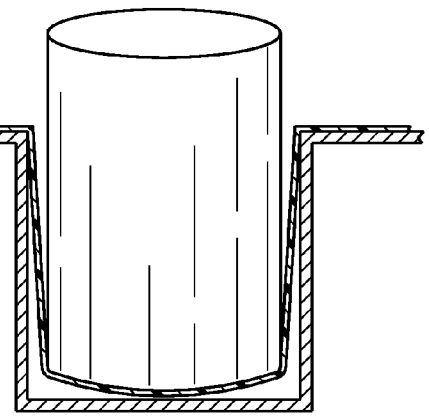
Figure 10:
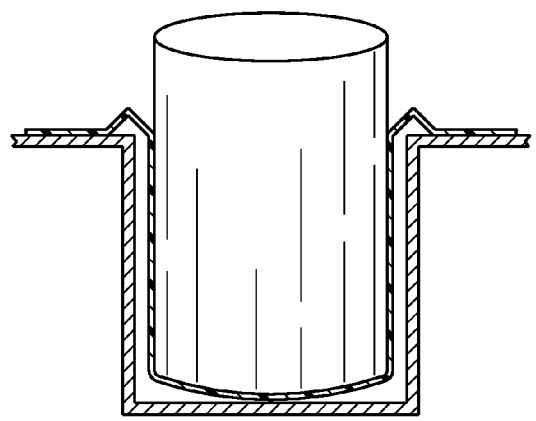
Figure 11:
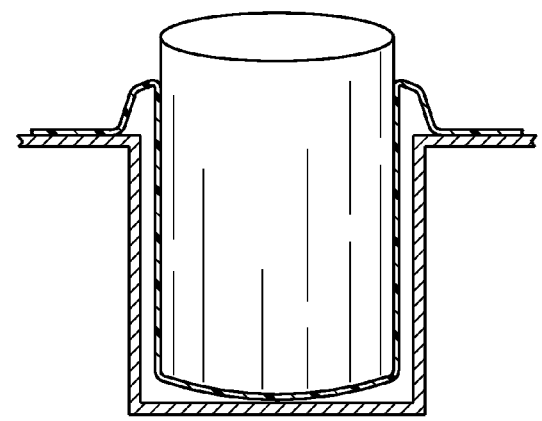

FIGS. 6 and 7 illustrate another embodiment of an AM holder where the holder extrudes upwards around the object. As can be seen in the figures, the AM holder 12 is located on a surface 10. The holder 12 has a sensor 14. When an object 16 is place on the AM holder 12, the sensor 14 activates the shape memory material such that it moves upward and around, covering a portion of the object, and securing the object 16 (e.g., a coffee mug) in place. For example, "extruding" fingers can protrude from the surface to grab objects from underneath a flexible surface. Fingers can be placed in different locations and orientations under the surface. After activation, the fingers will deform the surface to make contact with the object, holding it in place. The surface can comprise an active material that can be sufficiently flexible to move the desired amount when the material is heated, such as polymeric materials and/or shape memory polymers. Desirably, the flexible materials can endure high membrane deformations while providing low resistance to the AM (e.g., SMA) fingers. This combination process is further illustrated in FIGS. 8-11. In FIG. 8, insertion of the object into the holder begins, and is completed in FIG. 9. In FIG. 10, the conforming begins and completes in FIG. 11.

Figure 12:
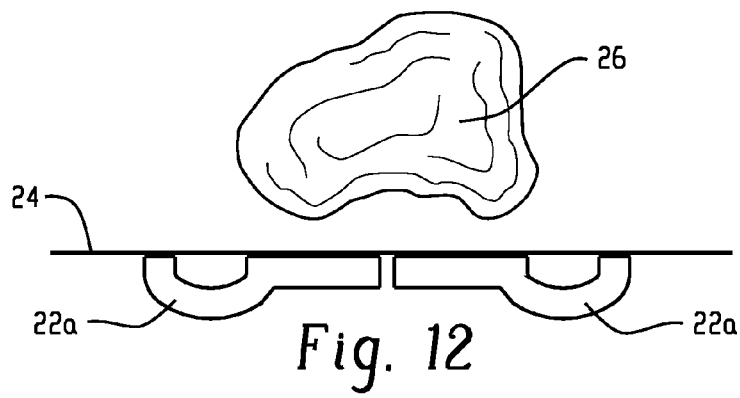
FIG. 12 is a schematic illustration of SMA fingers for grabbing an object.
Figure 13:
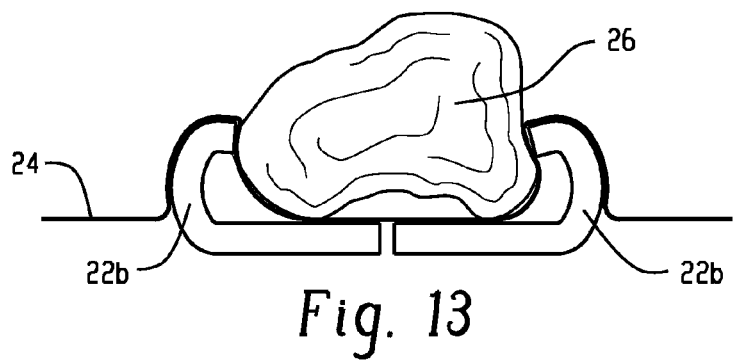
FIG. 13 is a cross-sectional view of the holder of FIG. 8 illustrating the fingers grabbing the object.

FIGS. 12 and 13, taken together, show the use of AM (e.g., SMA) fingers. The AM fingers 22 (a-b) can be designed such that the undeformed state (zero strain in martensitic/austenitic phase) is when the fingers 22b are deployed. In the initial stage, before the object 26 is placed and the surface is flat, the SMA fingers 22a will be in a deformed martensitic phase. As the object 26 is placed in the surface 24, an activation signal (e.g., from a sensor (e.g., weight sensor, pressure sensor, mechanical system, motion sensor, as well as a combination comprising any of the foregoing sensors); not shown) will trigger the process that will heat the SMA finger (to convert it to austenitic phase) forcing the fingers 22b to recover their original shape until the tips touch the object 26 with a certain pressure (for example, the activation of the SMA fingers can be done by resistance/inducting heating).

Figure 14:
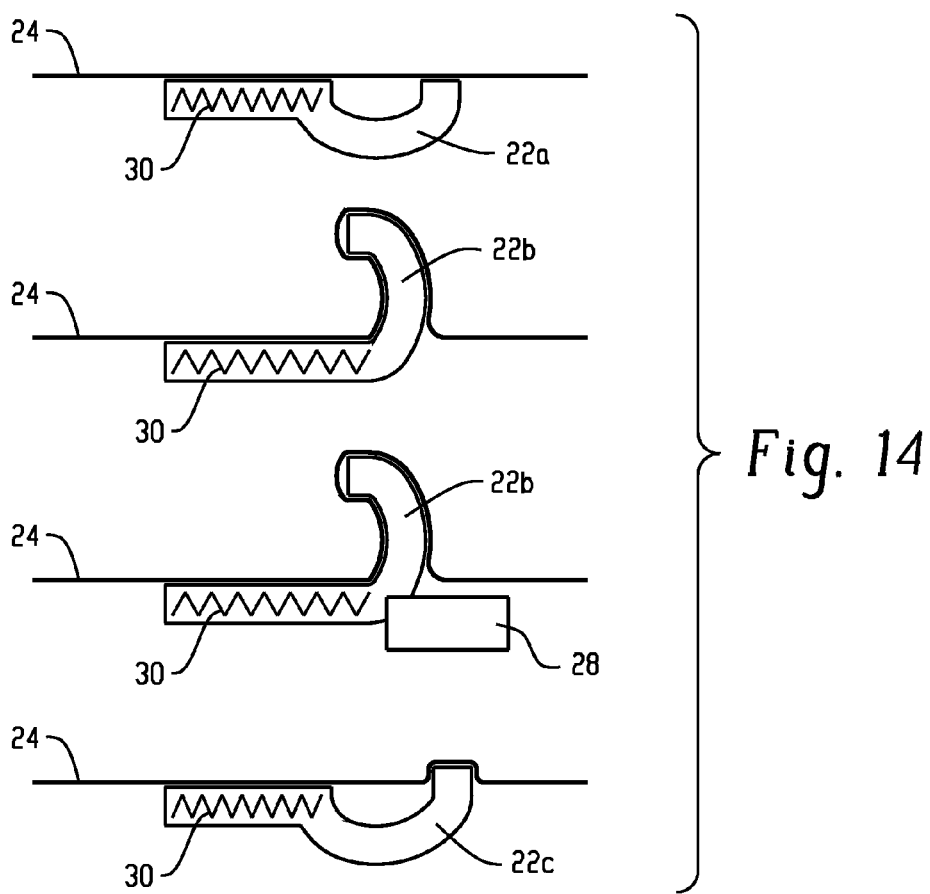
FIG. 14 illustrates embodiments of the fingers where they are disposed in different positions and states.

FIG. 14 shows an example of a locking mechanism 28 (e.g., bias spring) to hold the fingers 22b in place and to return them into the stowed position (22a). Power to hold the fingers 22b in the engaged position can be avoided if an appropriate mechanical/electrical/magnetic device is used; e.g., a zero-power hold. A bi-stable mechanism can maintain the finger in position. For example, the activation and deactivation of the locking mechanism can be also done by a different active material (e.g., SMA) and/or by SMA embedded into a SMP (e.g., where the SMP (at temperature below Tg) is used to fix the shape, and reheating the SMP can enable a change from a deployed to a stowed position). A locking mechanism 28a, such as a bias spring, can be attached at the bottom of the SMA finger 22a, such that the finger 22a returns to its stowed position (see FIG. 12) when the finger 22 is released. This will deform the finger 22a to the original ("deformed") position (see FIG. 13). Depending upon the amount of energy supplied to the AM to activate its material property change and/or deformation, the fingers can be disposed in numerous orientations so that objects of different size and shape could be grasped, e.g., 22b and 22c.

Figure 15:
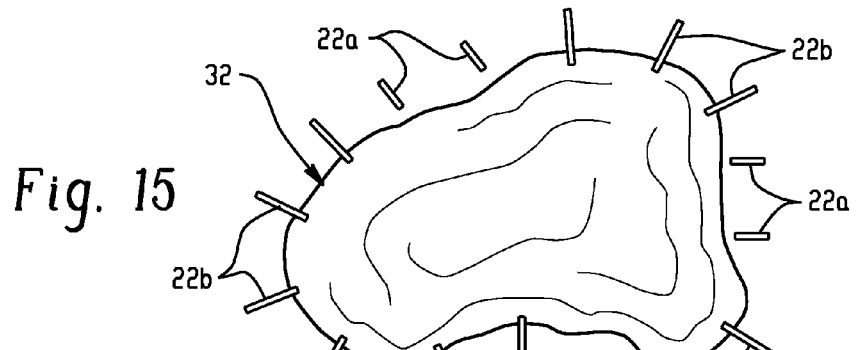
FIGS. 15-17 are illustrations of various shaped objects and possible finger locations.
Figure 16:
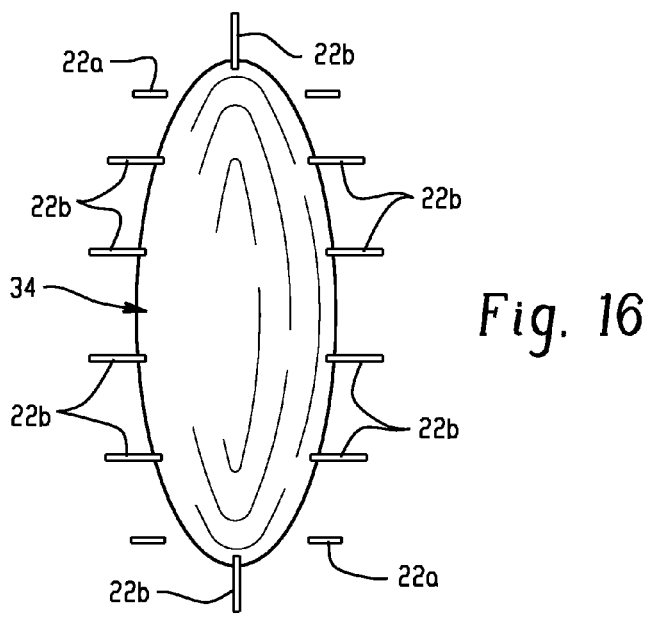
Figure 17:
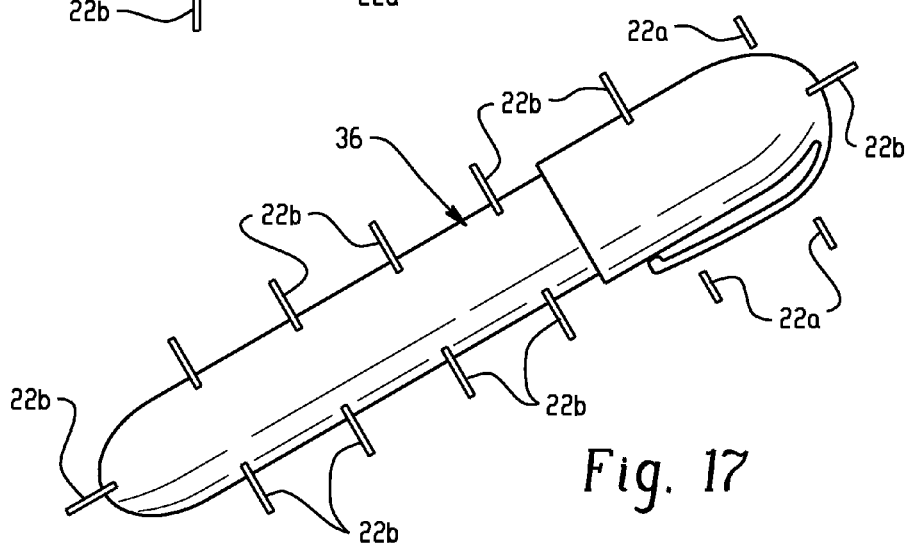

In order to hold objects with different shapes (random object 32, rounded object 34, and writing instrument 36) and sizes regardless of orientation, a network of SM (e.g., SMA, SMA embedded in a flexible polymer, SMP, etc.) fingers can be used as depicted in FIGS. 15-17. Groups of SM fingers 22 are positioned at different points with several orientations. Sensors can provide information to an algorithm to activate the necessary SMA fingers to grab the object.

The holder can comprise an array of rods and/or nodes, with variously connected SMP nodes, SMA rods, as well as a combination comprising at least one of the foregoing; e.g., similar to a tinker-toy. This three dimensional array, can have a flexible covering, forming a sandwich. The sandwich can be located on a flat surface (e.g., in the case of SMP nodes), or as a liner in a holder (e.g., in the case of both SMP nodes and SMA rods). In the case of SMP nodes, these can be activated to render the structure quite flexible/readily deformable in which state it could receive the object. The material would then be cooled to hold the object. Reheating would allow release of the object. In the case of SMA rods, when the rods were in their cold martensite state they could be deformed quite easily allowing the indenting placement of the object in the holder. Heating the SMA would cause the holder to conform to the shape of the inserted object and also be tightly grasped. Turning off the power would keep the conforming shape in the holder but allow the object to be withdrawn. Reheating the SMA after object withdrawal would return the SMA rod construction to its original shape.

Figure 18:
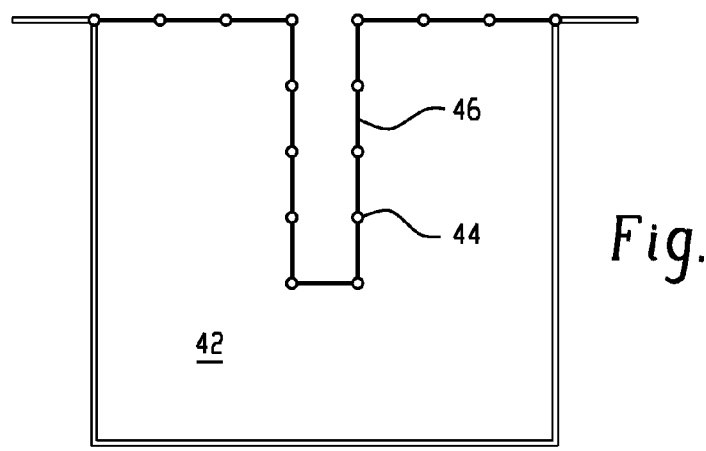
FIGS. 18-20 are exemplary embodiments of an active material holder comprising multiple segments connected in series or in parallel by many joints.
Figure 19:
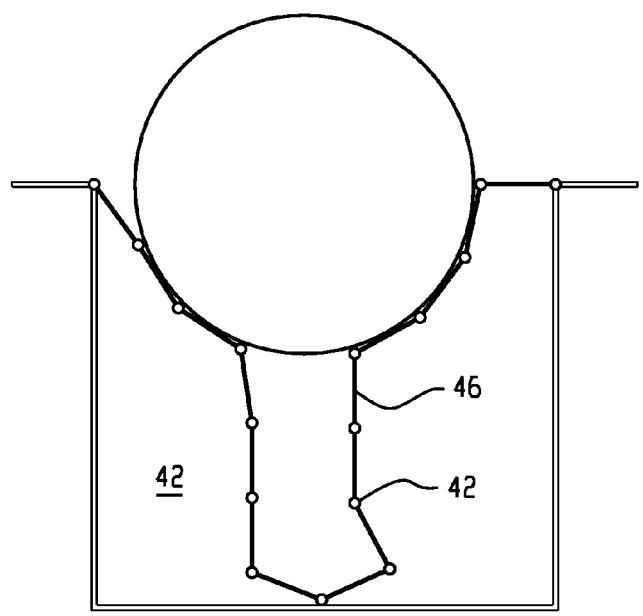
Figure 20:
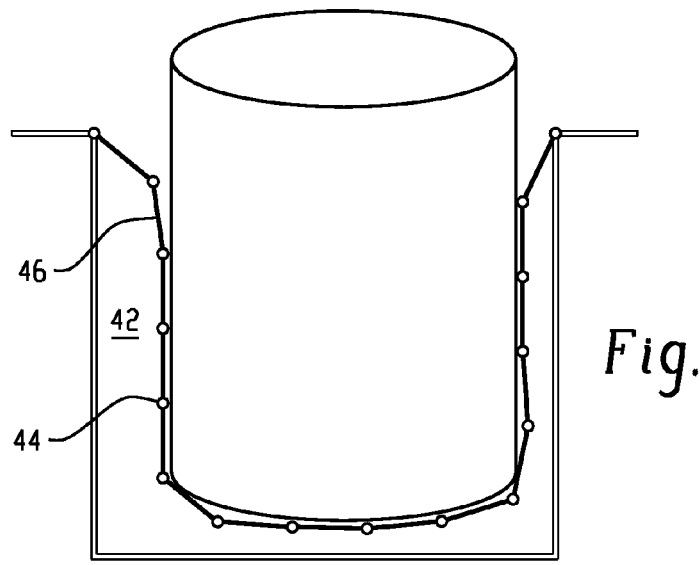

Referring to FIGS. 18-20, a holding portion located in and/or over a cavity 42 has stiff regions 46 connected with hinges 44 (or hinge like joints), that can be made of AM (e.g., SMP). For example, if the hinges 44 comprise SMP, when the hinges 44 are hot, relative rotation of the stiff regions are allowed, when cold, their relative position is locked, and when heated with no object present, the hinges 44 will return to their nominal positions. SMA wires (either in their superelastic mode, or in their shape recovery mode) could also be located throughout the surface to supply additional return force. Additionally, or in the alternative, the hinges 44 can comprise spring(s) (e.g., torsional bias spring(s)) to facilitate driving the AM to its nominal configuration.

With respect to MR and ER fluids, they could be used in layers, such as in the liners of object holders (e.g., in a leather foam sandwich or on the finger type application). With no field applied, these fluids would deform (flow) easily to receive an object. Activation of the field would effectively harden the film (increase its shear strength), lock in the shape of the liner, and grasp the object. Removing of the field would return the film to low shear strength and allow easy removal of the object.

Figure 21:
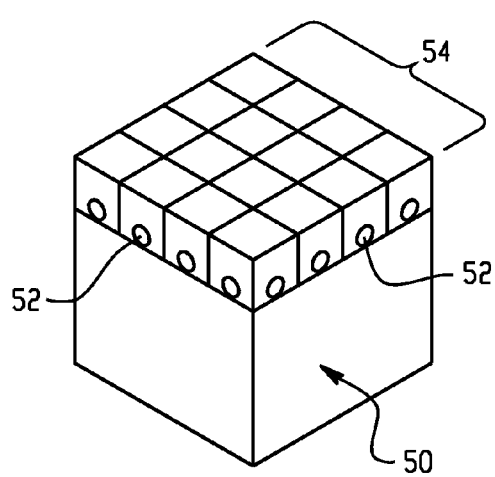
FIG. 21 is an exemplary, prospective view of an adaptive holder with a SMP cover/surface.

Referring to FIG. 21, depicted is a hollow box 50 with bands 54 of SMP interwoven over the top. When cold, the SMP is a stiff, semi-rigid surface, while when hot, the individual bands are rubbery. If a large object (e.g., a cup) is pressed against the top while the SMP bands are hot, the surface (e.g., the whole surface) will deform, and when cooled, the shape imparted by the object will be retained. Subsequent heating without the object present will return the surface to its flat configuration. If a small object (e.g., a pencil or pen) is pressed into the surface while the SMP bands are hot, the individual bands contacted by the object will stretch (and react as with a large object or) the object will slide between the stretched bands. Once the bands are cooled they will become rigid and hold the object in place. Again, subsequent heating without the object present will return the surface to its flat configuration.

Figure 22:
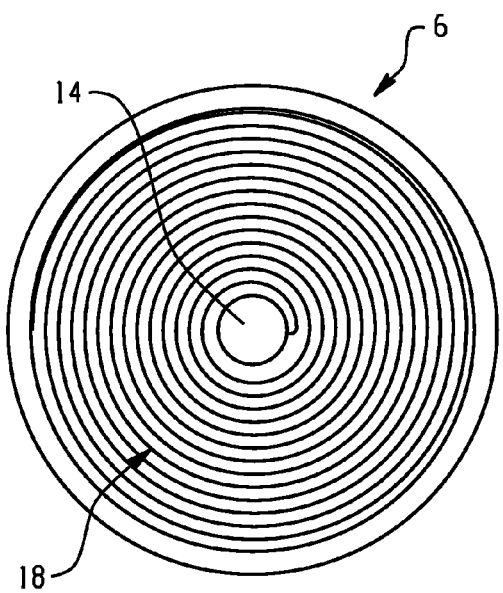
FIGS. 22-24 are exemplary embodiments of another embodiment of the holder illustrated in FIGS. 1-3, illustrated in a top view and side views, respectively.
Figure 23:
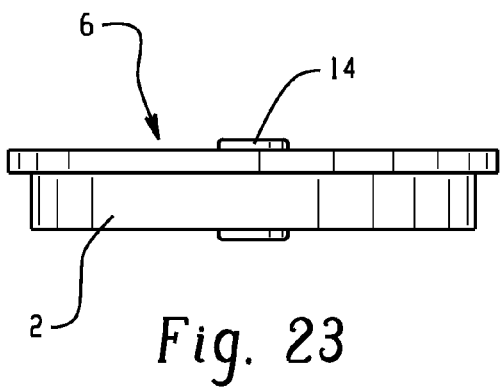
Figure 24:
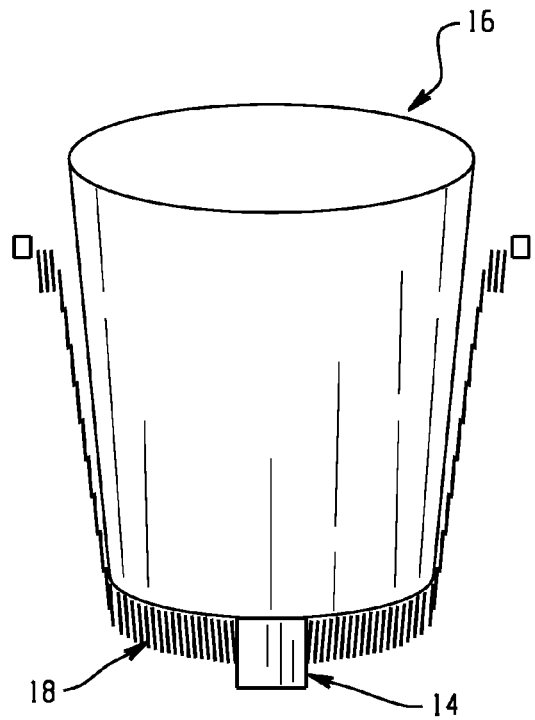
Figure 25:
FIGS. 25-28 are side views and top views, respectively, of an exemplary mechanical adaptive holding system driven by active materials.
Figure 26:
Figures 27, 28:
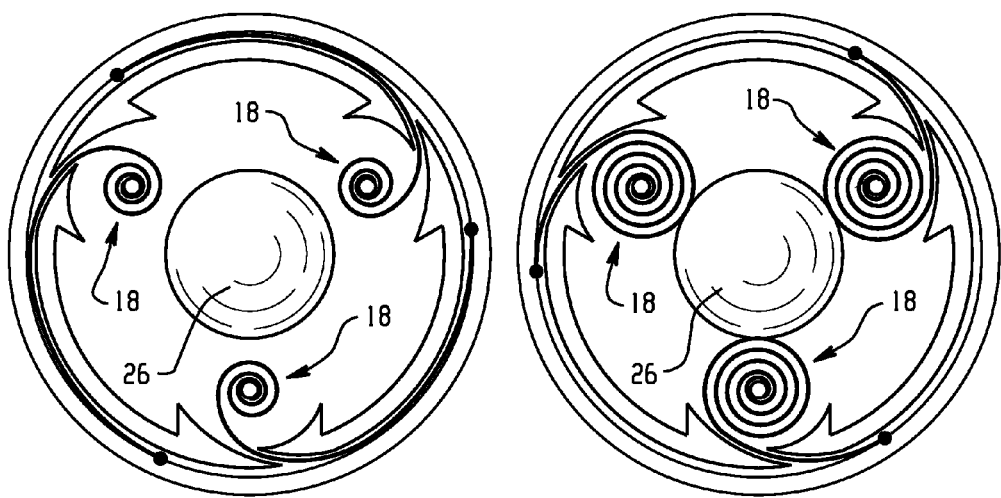
Figure 29:
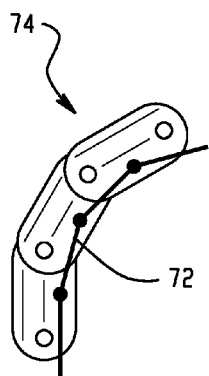
FIGS. 29-33 are views of a multi-segmented, deployable grasping device driven by active materials.
Figure 31:
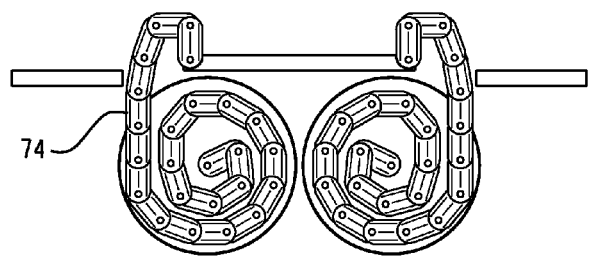
Figure 32:
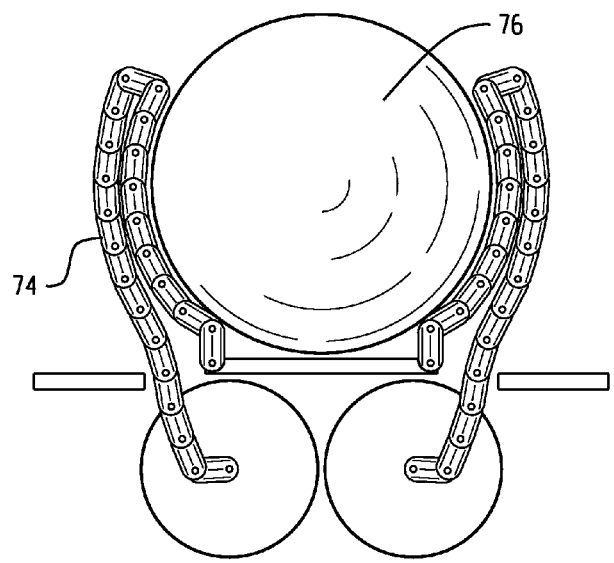
Figure 30:
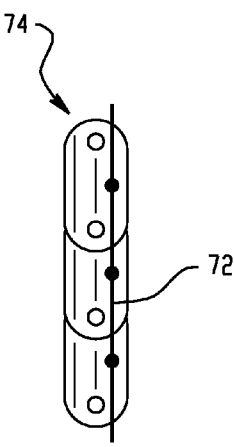
Figure 33:
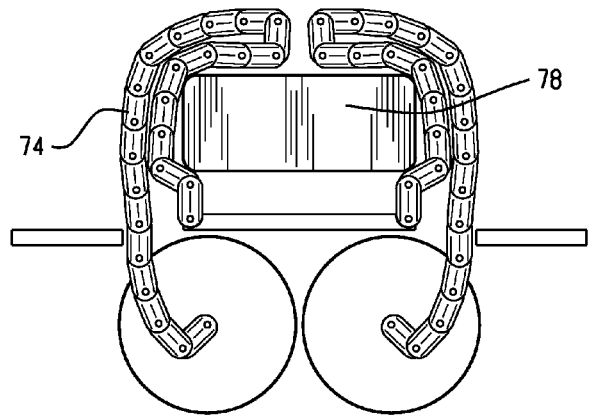

Similar to the embodiment illustrated in FIGS. 1-3, the holder can comprise a cover 6 with a coil of AM material 18 (e.g., a coiled tape of SMA), wound so that it produces a surface across (e.g., a flat surface above) a cavity (recess 2). (See FIGS. 22-24) If an object is pushed into the coil while it is at a low temperature, the coil will plastically deform into the cavity with an inner diameter substantially equivalent to an outer diameter of the object (e.g., the active material physically contacts the object such that the object is held by and located inside of the holder formed by the deformed active material), while providing support to the sides of the cup/object. Basically, larger coils would only displace if a lip on the next smaller coil forces it to deform or if a protrusion on the object deforms it. When the SMA is heated, and the object is removed, the coil will return to its original configuration, providing a flat surface.

FIGS. 25-28 provide an example of a mechanical adaptive holding system that uses shape memory properties to deploy and retract the securing fingers. A coil of SMA tape is used as the grasping device. When it is in the low temperature martensite state the coil could be unwound into the stowed position by pulling on one end with an activated SMA wire (or other actuator). To deploy the grasping finger 70, the AM coil 18 would be heated and would return to its coiled shape, which would protrude into the cavity. Multiple repeated units can be used to secure an object from multiple directions. Alternately, the coil can be, for example, a tape spring, that would try to wind up and the SMA actuator can provide only the pulling/straightening action, or the pulling/straightening can be provided by a linear spring and only the coiling would be due to activating the AM coil 18.

FIGS. 29-33 illustrate an embodiment where an object is retained (e.g., grasped) by an arm made of multiple links connected with pin joints that has AM wire 72 (e.g., SMA wire) attached to one side so that it would bend and/or curl in a certain direction (this could also be done with SMA wire embedded off to one side within a very compliant and flexible material). The rest of the system consists of a spool (spring loaded to coil the arm in the non-preferred direction, or hooked to a small motor) that would retract the arm. When the SMA is heated, it would overcome the spring force, rotate the spool, and try to bend and/or curl in the other direction. As it does this it would deploy, and wrap around the object. Turning the spool in the opposite direction would stow the spring. These arms could grasp in arrays and from multiple directions in order to better grasp and conform to the object it is holding.

The various embodiments of covers and cover movements disclosed herein simplify cover deployment and retrieval via the use of active materials such as SMA, SMP, ER, EAP, MR, and so forth. These smart holders can be employed in the absence, with the assistance of, or against gravity (e.g., on a wall or ceiling such as to hold a garage door opener to the underside of a sunvisor or the roof of a vehicle). Additionally, these holders can be portable (e.g., be attached to a chair, be part of a tray, etc.). These holders enable a cleaner design aesthetic; concealing the recess(es) used to fill these functions so that a designed surface curvature can be maintained when the holder is not being used. Finally, adaptive holders allow for a stronger grip on a wide variety of objects placed within a vehicle, allowing for better securing of their location and orientation as well allowing them to be accessed more easily. These devices can even be used to hold, retain, and/or contact active material-free objects (i.e., objects that do not comprise an active material), objects having a smooth surface, and objects wherein the active material portion only contacts the surface of the object (e.g., does not hook into material of the object). In other words, the holders can function without contacting the object subsurface (e.g., without engaging the object below a surface of the object).

The smart holders can be a device comprising one or more active materials. Activation of one or more of the active material(s) can cause and/or allow contact with an object to therein cause deformation within the device so that it can better conform and/or retain the object. In other embodiments, contact with an object causes deformation within the device so that it can better conform and/or retain the object. In some embodiments, deactivation of the active material(s) and/or activation of other active material(s), can fix the deformation within the device in its improved conforming/retaining state. In other embodiments deactivation of the active material(s) and/or activation of other active material(s) can reverse the deformation causing the device to try and/or to revert to its initial configuration.

Ranges disclosed herein are inclusive and combinable (e.g., ranges of "up to about 25 wt %, or, more specifically, about 5 wt % to about 20 wt %", is inclusive of the endpoints and all intermediate values of the ranges of "about 5 wt % to about 25 wt %," etc.). "Combination" is inclusive of blends, mixtures, derivatives, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements can be combined in any suitable manner in the various embodiments.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While the disclosure has been described with reference to an exemplary embodiment, it will be understood by those skilled in the art that various changes can be made and equivalents can be substituted for elements thereof without departing from the scope of the disclosure. In addition, many modifications can be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. An object holder configured for use in a vehicle, comprising:
   a recess;
   a cover disposed over the recess, wherein the cover comprises an active material, wherein the active material is configured to deform when contacted with an object; and
   a controller, wherein, when in use in the vehicle, the controller is configured to cause the active material to reversibly hold and retain the object.

2. The object holder of claim 1, wherein the controller comprises a weight activated switch and a sensor, and wherein causing the active material to reversibly hold and retain the object comprises an action selected from the group consisting of heating the active material, and signaling the controller.

3. The object holder of claim 1, wherein the active material is selected from the group consisting of MR fluid and ER fluid, and wherein the active material is located in an interior portion of the cover.

4. The object holder of claim 1, wherein the active material is in the form of a coil configured such that, with no object, the active material is wound forming a surface across the recess, and when pushed by an object, the active material deforms into the cavity to form a holder having a diameter substantially equivalent to an outer diameter of the object.

5. The object holder of claim 1, wherein the active material is configured to conform in some manner to a size and shape of the object.

6. The object holder of claim 1, further comprising a switch configured to allow the active material to revert to a non-deformed shape.

7. The object holder of claim 1, wherein the active material is configured to reversibly deform.

8. An object holder configured for use in a vehicle, comprising:
   a recess;
   a holding portion disposed at the recess and comprising an active material, wherein the active material is configured to, when contacted with an object, receive the object and deform to a shape of the object; and
   a switch, wherein, when in use in the vehicle, the switch is configured to retain the active material in the deformed shape until the object is removed.

9. The object holder of claim 8, wherein the holding portion comprises stiff regions connected together with the active material.

10. The object holder of claim 8, wherein the active material comprises SMP.

11. The object holder of claim 8, wherein the holder further comprises an SMA wire located through the holder and extending toward an end of the holder.

12. An object holder configured for use in a vehicle, comprising:
   a recess
   an element comprising an active material, wherein the active material is configured to reversibly, physically, deform; and
   a means for deforming the active material to hold and retain an object when the active material is contacted by the object;
   wherein, when the holder is in use in the vehicle, the active material holds and retains the object.

* * * * *